US011856664B2

United States Patent
Kawakita et al.

(10) Patent No.: US 11,856,664 B2
(45) Date of Patent: Dec. 26, 2023

(54) METHOD AND SYSTEM FOR PREVENTING DEW CONDENSATION AND LIGHT SCATTERING DUE TO DEW CONDENSATION

(71) Applicant: NATIONAL INSTITUTE FOR MATERIALS SCIENCE, Ibaraki (JP)

(72) Inventors: Jin Kawakita, Ibaraki (JP); Toyohiro Chikyo, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 1043 days.

(21) Appl. No.: 16/483,815

(22) PCT Filed: Feb. 2, 2018

(86) PCT No.: PCT/JP2018/003512
§ 371 (c)(1),
(2) Date: Aug. 6, 2019

(87) PCT Pub. No.: WO2018/150903
PCT Pub. Date: Aug. 23, 2018

(65) Prior Publication Data
US 2020/0053837 A1 Feb. 13, 2020

(30) Foreign Application Priority Data
Feb. 14, 2017 (JP) .................. 2017-024629

(51) Int. Cl.
*H05B 3/84* (2006.01)
*B60S 1/08* (2006.01)
(Continued)

(52) U.S. Cl.
CPC .............. *H05B 3/84* (2013.01); *B60S 1/0822* (2013.01); *G01M 3/04* (2013.01); *G01N 27/26* (2013.01); *G01N 27/416* (2013.01)

(58) Field of Classification Search
CPC ........ H05B 3/84; B60S 1/0822; B60S 1/0825; G01M 3/04; G01N 27/26; G01N 27/416; G02B 27/0006
(Continued)

(56) References Cited

U.S. PATENT DOCUMENTS 3,864,659 A * 2/1975 Furuuchi .............. G01N 27/121
219/203
2011/0033764 A1 2/2011 Wang et al.
(Continued)

FOREIGN PATENT DOCUMENTS

CN 102692432 A * 9/2012
CN 105606668 A * 5/2016
(Continued)

OTHER PUBLICATIONS

Communication pursuant to Article 94(3) EPC dated Jun. 17, 2021 in corresponding European Patent Application No. 18 754 010.9.
(Continued)

*Primary Examiner* — Marrit Eyassu
(74) *Attorney, Agent, or Firm* — WENDEROTH, LIND & PONACK, L.L.P.

(57) ABSTRACT

The present invention is to provide a prevention method and a prevention system for preventing dew condensation and light scattering due to the dew condensation. According to one embodiment of the present invention, a fine liquid droplet capable of causing dew condensation is detected by a detection means for detecting a fine liquid droplet, and then the fine liquid droplet is removed on the basis of the detection. The detection means comprises a first thin wire made of a first metal, and a second thin wire made of a second metal or a semiconductor, the second metal is different from the first metal, the first thin wire and the second thin wire are disposed in juxtaposition with each
(Continued)

other on an insulating substrate, and a spacing between the first thin wire and the second thin wire is in a range of 20 nm or more and 10000 nm or less. Further, provided is a prevention system including a detection means for detecting a fine liquid droplet, a removing means for removing the fine liquid droplet, and a control means for controlling the removing means on the basis of information from the detection means.

20 Claims, 8 Drawing Sheets

(51) Int. Cl.
    *G01N 27/26*     (2006.01)
    *G01N 27/416*     (2006.01)
    *G01M 3/04*     (2006.01)

(58) Field of Classification Search
    USPC .......................................................... 219/203
    See application file for complete search history.

(56) References Cited

U.S. PATENT DOCUMENTS

| | | | |
|---|---|---|---|
| 2013/0219742 A1* | 8/2013 | Field | G02B 27/0006 34/565 |
| 2017/0167995 A1 | 6/2017 | Kawakita et al. | |
| 2018/0113297 A1* | 4/2018 | Desai | G02B 1/18 |

FOREIGN PATENT DOCUMENTS

| | | | | |
|---|---|---|---|---|
| JP | 5-2007 | | 1/1993 | |
| JP | 2001240146 A | * | 9/2001 | |
| JP | 2003098141 A | * | 4/2003 | |
| JP | 2011041437 A | * | 2/2011 | ........... H01F 27/402 |
| JP | 2011-128091 | | 6/2011 | |
| KR | 100442977 B1 | * | 8/2004 | |
| KR | 20160101114 A | * | 8/2016 | |
| WO | WO-2004017053 A1 | * | 2/2004 | ....... B32B 17/10036 |
| WO | 2016/013544 | | 1/2016 | |
| WO | WO-2016013544 A1 | * | 1/2016 | ............. G01N 17/04 |

OTHER PUBLICATIONS

Communication pursuant to Article 94(3) EPC dated Dec. 15, 2021 in corresponding European Patent Application No. 18 754 010.9.
Communication pursuant to Article 94(3) EPC dated Jun. 14, 2022 in corresponding European Patent Application No. 18754010.9.
International Search Report dated May 1, 2018 in International Application No. PCT/JP2018/003512.
JIII Journal of Technical Disclosure No. 2004-500855, Japan Institute for Promoting Invention and Innnovation, Feb. 1, 2004, 13 pages total, with Machine English Translation.
Extended European Search Report dated Nov. 18, 2020 in corresponding European Patent Application No. 18754010.9.
Notice of Reasons for Refusal dated Apr. 28, 2020 in corresponding Japanese Patent Application No. 2018-568107, with English Translation.

* cited by examiner

INTER-THIN WIRE DISTANCE : 10 μm

METHOD AND SYSTEM FOR PREVENTING DEW CONDENSATION AND LIGHT SCATTERING DUE TO DEW CONDENSATION

TECHNICAL FIELD

The present invention relates to a method for and a system for preventing dew condensation and light scattering due to the dew condensation.

BACKGROUND ART

If dew condensation is generated on a surface of an object, the dew condensation may cause mold, rust, or light scattering. For example, in a case of a wall, mold is often generated by using a contamination attached to a wall material or a surface of the wall material as a nutrient in the presence of moisture due to dew condensation, and in a case of a metal, rust is generated due to corrosion. Further, if dew condensation is generate d on a transparent member such as a window, cloudiness is generated. If dew condensation is generated on a lens due to high humidity, or the like, the light entering a lens is scattered, and imaging performance of the lens is degraded, for example, image distortion is generated. In a case where the size of a water droplet due to dew condensation is small, the image becomes in a flared state, and the contrast of imaging is reduced. In addition, in a case of a light or a projector lens, the irradiation performance such as light directivity is degraded.

Since such a problem occurs, in a case where dew condensation is generated, the dew condensation is removed by using blowing, air ventilation, heating, a wiper, or a dehumidifier, however, it is more preferable to prevent the dew condensation from the viewpoint of energy and cost, and further ensuring safety and soundness. For example, in a case of mold, not only if long-term dew condensation is generated but also if short-term dew condensation is generated frequently, mold is generated and grows. In a case of rust, rust causes deterioration in the mechanical and aesthetic properties. In a case of a window or a lens, a problem in use may be occurred if the image degradation is generated even temporarily due to light scattering.

As the method for preventing dew condensation, there are methods of maintaining the dry state by performing dehumidification with constant heating, and a supply of gases such as dry air and dry nitrogen, however, these methods are methods of consuming energy for dehumidification even the dehumidification is not required, and therefore this is not preferable from the viewpoint of energy saving.

Further, there is a method in which temperature and humidity are monitored, and when a condition under which dew condensation is started to occur is reached, the dehumidification is started. In this case, the response speed of monitoring of temperature and humidity can be an issue, and there has been a problem that the response cannot be fully performed particularly in a case where the temperature and humidity are changed rapidly and dew condensation is generated, and also there has been a problem that the equipment for monitoring temperature and humidity with high response speed is relatively large and the mechanism is complicated. In addition, in the relationship between the dew condensation and the temperature and humidity, the accuracy is not so high because the relationship is affected also by another factor such as contamination on an object. For this reason, it is required to start the dehumidification with a sufficient margin, and thus there has been a problem of being unfavorable from the viewpoint of energy saving.

As for the humidity sensor, for example, a method is known, which detects humidity according to a change in the electric resistance value (impedance) or the capacitance of a sensor element (dryness and wetness responsive unit).

As for the electrical resistance-type humidity sensor, in general, a polymer, a ceramic, or the like is used as a dryness and wetness responsive material for a sensor element, and since the material is inexpensive and the structure is simple, the reduction in cost due to mass production can be realized. However, the electrical resistance-type humidity sensor has an extremely large change over time, and in many cases, the temperature dependency is also high, and therefore, the temperature correction is required. Further, the electrical resistance-type humidity sensor has a large variation in accuracy (around ±5 to 15% RH), and is slow in response (30 seconds to several minutes or more).

In general, in a capacitance-type humidity sensor, a polymer membrane is used as a dryness and wetness responsive material for a sensor element, the response speed is faster (usually, several seconds to before and after 10 seconds) as compared with the electrical resistance-type humidity sensor, and the accuracy, reproducibility, and reliability are excellent. However, there is a problem that the production cost is high.

Further, even in a case of any humidity sensor of an electrical resistance-type humidity sensor and a capacitance-type humidity sensor, in a state in which the relative humidity is 100%, that is, the dew condensation is perfectly generated, a so-called immersed state, the measurement cannot be performed properly, and further, the sensor may not be returned to the dry state and may become out of use. In addition, an external drive power source to drive the sensor is required, and the device is large-sized and complicated. In this regard, a detector for a liquid droplet generated due to dew condensation has been disclosed, for example, in Patent Literature 1.

CITATION LIST

Patent Literature

Patent Literature 1: WO 2016/13544 A1

SUMMARY OF INVENTION

Technical Problem

An object of the present invention is to provide a method for preventing the generation of dew condensation and light scattering generated due to the dew condensation, and a prevention system therefor.

Solution to Problem

The constitution of the present invention is shown below.
(Constitution 1)
A method for preventing dew condensation including
  detecting a fine liquid droplet capable of causing dew condensation, and
  removing the fine liquid droplet on the basis of the detection, wherein
  a detection means for detecting the fine liquid droplet comprises a first thin wire made of a first metal, and
a second thin wire made of a second metal or a semiconductor, the second metal being different from the first metal,
wherein the first thin wire and the second thin wire are disposed in juxtaposition with each other on an insulating substrate, and
wherein a spacing between the first thin wire and the second thin wire is in a range of 20 nm or more and 10000 nm or less.

(Constitution 2)

The method for preventing dew condensation described in constitution 1, wherein
the detection means comprises a plurality of at least one selected from the group consisting of the first thin wire and the second thin wire, and
wherein the first thin wire extends from a first side towards a second side that is opposite to the first side and the second thin wire extends from the second side towards the first side such that the first thin wire and the second thin wire run in parallel.

(Constitution 3)

The method for preventing dew condensation described in constitution 1, wherein the first thin wire and the second thin wire are arranged in a double spiral.

(Constitution 4)

The method for preventing dew condensation described in any one of constitutions 1 to 3, wherein the insulating substrate is a silicon substrate with a silicon oxide film on its surface.

(Constitution 5)

The method for preventing dew condensation described in any one of constitutions 1 to 4, wherein the first metal is selected from a group consisting of gold, platinum, silver, titanium, an alloy thereof, and carbon.

(Constitution 6)

The method for preventing dew condensation described in any one of constitutions 1 to 5, wherein the second metal is selected from a group consisting of silver, copper, iron, zinc, nickel, cobalt, aluminum, tin, chromium, molybdenum, manganese, magnesium, and an alloy thereof.

(Constitution 7)

The method for preventing dew condensation described in any one of constitutions 1 to 6, wherein the spacing between the first thin wire and the second thin wire is in a range of 20 nm or more and 5000 nm or less.

(Constitution 8)

The method for preventing dew condensation described in any one of constitutions 1 to 6, wherein the spacing between the first thin wire and the second thin wire is in a range of 20 nm or more and 2000 nm or less.

(Constitution 9)

The method for preventing dew condensation described in any one of constitutions 1 to 8, wherein the fine liquid droplet is removed by heating.

(Constitution 10)

The method for preventing dew condensation described in any one of constitutions 1 to 8, wherein the fine liquid droplet is removed by dry gas supplying.

(Constitution 11)

A method for preventing light scattering including
detecting a fine liquid droplet having a size smaller than that of a liquid droplet capable of causing light scattering, and
removing the fine liquid droplet on the basis of the detection, wherein
a detection means for detecting the fine liquid droplet comprises
a first thin wire made of a first metal, and
a second thin wire made of a second metal or a semiconductor, the second metal being different from the first metal,
wherein the first thin wire and the second thin wire are disposed in juxtaposition with each other on an insulating substrate, and
wherein a spacing between the first thin wire and the second thin wire is in a range of 20 nm or more and 7 times or less a minimum wavelength of a light to be targeted for prevention of light scattering.

(Constitution 12)

The method for preventing light scattering described in constitution 11, wherein the spacing between the first thin wire and the second thin wire is in a range of 20 nm or more and 0.7 times or less a minimum wavelength of a light to be targeted for prevention of light scattering.

(Constitution 13)

The method for preventing light scattering described in constitution 11 or 12, wherein
the detection means comprises a plurality of at least one selected from the group consisting of the first thin wire and the second thin wire, and wherein the first thin wire extends from a first side towards a second side that is opposite to the first side and the second thin wire extends from the second side towards the first side such that the first thin wire and the second thin wire run in parallel.

(Constitution 14)

The method for preventing light scattering described in constitution 11 or 12, wherein the first thin wire and the second thin wire are arranged in a double spiral.

(Constitution 15)

The method for preventing light scattering described in any one of constitutions 11 to 14, wherein the insulating substrate is a silicon substrate with a silicon oxide film on its surface.

(Constitution 16)

The method for preventing light scattering described in any one of constitutions 11 to 15, wherein the first metal is selected from a group consisting of gold, platinum, silver, titanium, an alloy thereof, and carbon.

(Constitution 17)

The method for preventing light scattering described in any one of constitutions 11 to 16, wherein the second metal is selected from a group consisting of silver, copper, iron, zinc, nickel, cobalt, aluminum, tin, chromium, molybdenum, manganese, magnesium, and an alloy thereof.

(Constitution 18)

The method for preventing light scattering described in any one of constitutions 11 to 17, wherein the fine liquid droplet is removed by heating.

(Constitution 19)

The method for preventing light scattering described in any one of constitutions 11 to 17, wherein the fine liquid droplet is removed by supplying dry gas.

(Constitution 20)

A system for preventing dew condensation including
a detection means for detecting a fine liquid droplet,
a removing means for removing the fine liquid droplet, and
a control means for controlling the removing means on the basis of information from the detection means, wherein the detection means comprises
a first thin wire made of a first metal, and
a second thin wire made of a second metal or a semiconductor, the second metal being different from the first metal,
wherein the first thin wire and the second thin wire are disposed in juxtaposition with each other on an insulating substrate, and
wherein a spacing between the first thin wire and the second thin wire is in a range of 20 nm or more and 10000 nm or less.

(Constitution 21)

The system for preventing dew condensation described in constitution 20, wherein
the detection means comprises a plurality of at least one selected from the group consisting of the first thin wire and the second thin wire, and
wherein the first thin wire extends from a first side towards a second side that is opposite to the first side and the second thin wire extends from the second side towards the first side such that the first thin wire and the second thin wire run in parallel.

(Constitution 22)

The system for preventing dew condensation described in constitution 20, wherein the first thin wire and the second thin wire are arranged in a double spiral.

(Constitution 23)

The system for preventing dew condensation described in any one of constitutions 20 to 22, wherein the insulating substrate is a silicon substrate with a silicon oxide film on its surface.

(Constitution 24)

The system for preventing dew condensation described in any one of constitutions 20 to 23, wherein the first metal is selected from a group consisting of gold, platinum, silver, titanium, an alloy thereof, and carbon.

(Constitution 25)

The system for preventing dew condensation described in any one of constitutions 20 to 24, wherein the second metal is selected from a group consisting of silver, copper, iron, zinc, nickel, cobalt, aluminum, tin, chromium, molybdenum, manganese, magnesium, and an alloy thereof.

(Constitution 26)

The system for preventing dew condensation described in any one of constitutions 20 to 25, wherein the spacing between the first thin wire and the second thin wire is in a range of 20 nm or more and 5000 nm or less.

(Constitution 27)

The system for preventing dew condensation described in any one of constitutions 20 to 25, wherein the spacing between the first thin wire an d the second thin wire is in a range of 20 nm or more and 2000 nm or less.

(Constitution 28)

The system for preventing dew condensation described in any one of constitutions 20 to 27, wherein the removing means is a heating means.

(Constitution 29)

The system for preventing dew condensation described in any one of constitutions 20 to 27, wherein the removing means is a dry gas supplying means.

(Constitution 30)

A system for preventing light scattering including
a detection means for detecting a fine liquid droplet having a size smaller than that of a liquid droplet capable of causing light scattering,
a removing means for removing the fine liquid droplet, and
a control means for controlling the removing means on the basis of information from the detection means, wherein
the detection means comprises
a first thin wire made of a first metal, and
a second thin wire made of a second metal or a semiconductor, the second metal being different from the first metal,
wherein the first thin wire and the second thin wire are disposed in juxtaposition with each other on an insulating substrate, and
wherein a spacing between the first thin wire and the second thin wire is in a range of 20 nm or more and 7 times or less a minimum wavelength of a light to be targeted for prevention of light scattering.

(Constitution 31)

The system for preventing light scattering described in constitution 30, wherein the spacing between the first thin wire and the second thin wire is in a range of 20 nm or more and 0.7 times or less a minimum wavelength of a light to be targeted for prevention of light scattering.

(Constitution 32)

The system for preventing light scattering described in constitution 30 or 31, wherein
the detection means comprises a plurality of at least one selected from the group consisting of the first thin wire and the second thin wire, and wherein the first thin wire extends from a first side towards a second side that is opposite to the first side and the second thin wire extends from the second side towards the first side such that the first thin wire and the second thin wire run in parallel.

(Constitution 33)

The system for preventing light scattering described in constitution 30 or 31, wherein the first thin wire and the second thin wire are arranged in a double spiral.

(Constitution 34)

The system for preventing light scattering described in any one of constitutions 30 to 33, wherein the insulating substrate is a silicon substrate with a silicon oxide film on its surface.

(Constitution 35)

The system for preventing light scattering described in any one of constitutions 30 to 34, wherein the first metal is selected from a group consisting of gold, platinum, silver, titanium, an alloy thereof, and carbon.

(Constitution 36)

The system for preventing light scattering described in any one of constitutions 30 to 35, wherein the second metal is selected from a group consisting of silver, copper, iron, zinc, nickel, cobalt, aluminum, tin, chromium, molybdenum, manganese, magnesium, and an alloy thereof.

(Constitution 37)

The system for preventing light scattering described in any one of constitutions 30 to 36, wherein the removing means is a heating means.

(Constitution 38)

The system for preventing light scattering described in any one of constitutions 30 to 36, wherein the removing means is a dry gas supplying means.

Advantageous Effects of Invention

According to the present invention, mold, rust, and light scattering, which are generated due to dew condensation, can be prevented. Moreover, the present invention is characterized in that a detection unit (sensor) for detecting signs of the mold, rust, and light scattering is highly sensitive with small size, and further that electric power supply from the outside is not necessarily required for driving the sensor.

DESCRIPTION OF EMBODIMENTS

Figure 1:
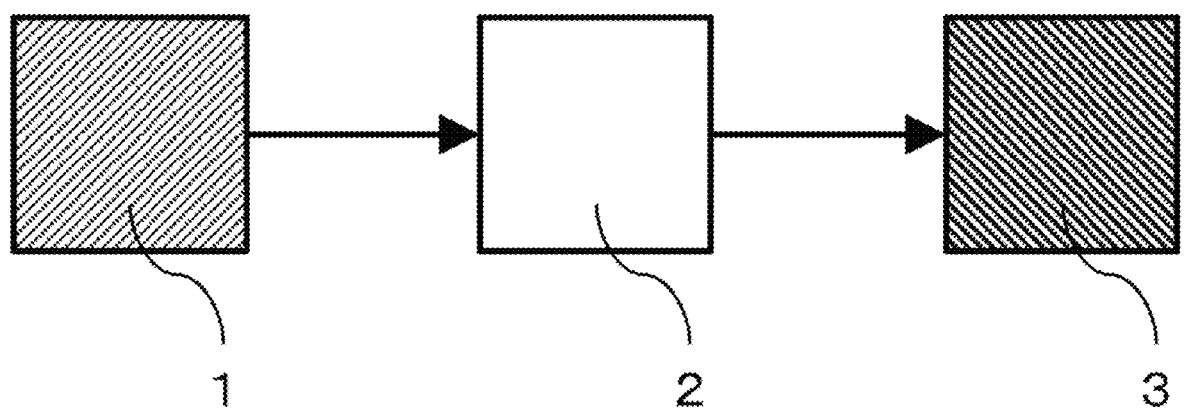
FIG. 1 is a conceptual diagram showing a system configuration of the present invention.

Hereinafter, the embodiment of the present invention will be described with reference to the drawings.

Dew condensation is caused as follows. At first, a fine liquid droplet is generated, and then the liquid droplet grows large in size.

Therefore, in the present invention, a fine liquid droplet before dew condensation that causes mold, rust, and light scattering is detected at a stage where the fine liquid droplet is generated, and removal of the fine liquid droplet, for example, dehumidification is started to prevent a problem of the generation of mold and rust, light scattering, and the like at a stage where the fine liquid droplet is generated, at a stage where the liquid droplet reaches a certain size before the problem is occurred, or at an appropriate stage of a liquid-droplet growth situation. Since the removal of a fine liquid droplet can be started at an appropriate time before a problem is occurred, prevention of dew condensation and the like, which is excellent in the energy saving performance, can be performed.

The expression "liquid droplet" is referred to as a water droplet, or a liquid droplet made of an aqueous solution in which impurities such as substances suspended in the air, and substances attached to an object to which the liquid droplet is to be attached are mixed in water. Since the liquid droplet contains impurities that serves as an electrolyte, the liquid droplet has conductivity unlike in the case of ultrapure water.

Further, as a method for removing a fine liquid droplet, in addition to dehumidification, a method for mechanically eliminating liquid droplets, such as wiping, and air blow, a method for chemically removing liquid droplets, in which the liquid droplets are allowed to be compatible with alcohol or the like, and to evaporate as a liquid with high volatility, or the like can be mentioned.

(Size of Liquid Droplet to be Detected)

Next, the size of the fine liquid droplet to be detected will be described.

A fine liquid droplet serves as a core, and the fine liquid droplet grows, and dew condensation is formed. On the other hand, an extremely small liquid droplet evaporates and disappears over time. This is because in an extremely small liquid droplet, the evaporation rate exceeds the growth rate of the liquid droplet due to the relationship with the ratio of the volume to the surface area. Whether the fine liquid droplet evaporates and disappears or grows to form a liquid droplet depends largely on the humidity of the environment in which the fine liquid droplet is present.

The size of the liquid droplet (diameter of liquid droplet 2r) in an equilibrium state in which the evaporation rate and the growth rate are balanced and the size of the liquid droplet does not change is given by the following equation (1) that is Kelvin equation by applying the liquid droplet as a sphere. The shape of the fine liquid droplet is spherical since the surface tension is the controlling factor.

$$2r = 4\gamma M / [\rho RT \cdot lN(P_r/P_s)] \qquad (1)$$

In the equation (1), $P_r$ is a vapor pressure of a liquid droplet having a radius of "r" (Pa), $P_s$ is a saturated vapor pressure (vapor pressure of a liquid droplet in a horizontal plane) (Pa), γ is a surface tension of a liquid droplet (N/m), M is a molar mass of a liquid droplet (Kg/mol), ρ is a density of a liquid droplet (Kg/m³), R is a gas constant (8.31 J/Kmol), and T is an absolute temperature (K).

Next, when the degree to which the supersaturated vapor pressure is generated is examined in detail, it has been found that in a state of room temperature (23° C.), the supersaturated vapor pressure is 105% of 5% supersaturation in a normal environment, and is 110% of 10% supersaturation in a harsh environment of, for example, a lens material placed in an environment with large temperature difference between the front and the back. In a case where the liquid droplet is a water droplet, since the surface tension "γ" of water is 0.072 N/m, the molar mass "M" is 0.0018 Kg/mol, and the density "ρ" is 1000 Kg/m³, when these values are applied to equation (1), the diameter (2r) of the growing liquid droplet (water droplet) is 20 nm or more in a 10% supersaturated vapor pressure situation, and 40 nm or more in a 5% supersaturated vapor pressure situation.

Next, the size of a liquid droplet, at which dew condensation is generated, will be described.

The size at which dew condensation can be visually observed is 10 µm (10000 nm) in a case of one liquid droplet, 5 µm (5000 nm) in a case of an assembly of liquid droplets in which the liquid droplets are arranged randomly to a certain extent, and 3 µm (3000 nm) in a case of an assembly of liquid droplets in which the liquid droplets are arranged almost regularly.

Therefore, the size (diameter) of the fine liquid droplet that is required to be detected to prevent dew condensation is 20 nm or more and 100 00 nm or less in a harsh environment, and 40 nm or more and 10000 nm or less in a normal environment, preferably 20 nm or more and 5000 nm or less in a harsh environment, and 40 nm or more and 5000 nm or less in a normal environment, and more preferably 20 nm or more and 3000 nm or less in a harsh environment, and 40 nm or more and 3000 nm or less in a normal environment.

Next, the size of a liquid droplet, at which mold is generated, has been examined.

The size of mold varies depending on the type of mold, even mold having a small size has a size larger than 2 µm (2000 nm). Further, after detailed examination, it has been found that water having a size of at least approximately the same extent as that of mold is required for the mold growth. For this reason, in order to prevent the generation of mold, it is required to detect a liquid droplet having a size of 2000 nm or less, and to remove the fine liquid droplet by dehumidification or the like before the liquid droplet becomes larger than 2000 nm.

Therefore, the size (diameter) of the fine liquid droplet that is required to be detected to prevent the generation of mold is 20 nm or more and 2000 nm or less in a harsh environment, and 40 nm or more and 2000 nm or less in a normal environment.

Next, the size of a liquid droplet, at which rust is generated, has been examined.

Rust is a compound mainly containing a metal oxide or a metal hydroxide, which is generated by attaching moisture to a metal, and allowing electrochemical reaction (corrosion reaction) between the metal and the oxygen dissolved in the moisture to proceed. The rate of the corrosion reaction shows a parabolic rule depending on the distance where oxygen in the air is dissolved in moisture and reaches a surface of a metal, and the distance becomes maximum at 10 μm or more and 100 μm or less. Therefore, by detecting a fine water droplet having a size of 10 μm (10000 nm) or less, the corrosion rate of a metal, that is, the generation rate of rust can be suppressed, and by reducing the diameter of a water droplet that can be detected, the generation rate of rust can be reduced.

Next, the size of a liquid droplet, at which light scattering becomes a problem, will be described.

In a case where a scattering object is as large as around the wavelength of light, the light scattering can be described by using wave optics. Further, light scattering is observed as various phenomena such as cloudiness, flare, diffraction, and interference, and all of which are caused by interference of light.

When a liquid droplet is attached onto an optical member, difference in optical path length is generated between the light passing through the liquid droplet and the light passing through the part where no liquid droplet is present, and these lights interfere with each other. As frequently defined by the allowance of aberration for an optical lens, in the light-transmission system, when the wavelength of light is λ, if the optical path length difference exceeds λ/4, the aberration (disturbance of transmitted light due to light interference) rapidly increases, and various phenomena such as cloudiness, flare, diffraction, and interference become obvious. In the reflection system, since light is reflected by a mirror surface and reciprocates in a liquid droplet, if the optical path length difference exceeds λ/8, the aberration rapidly increases, and various phenomena such as cloudiness, flare, diffraction, and interference become obvious.

The shape of the thickest fine liquid droplet is spherical. Further, in a microscopic object in which the surface tension is dominant, when the surface onto which a fine liquid droplet is attached is a hydrophobic surface, the fine liquid droplet exhibits a spherical shape. In order to calculate the average thickness of the liquid film, when the spherical liquid droplet is approximated by a cube of which the volume is equal to the volume of the spherical liquid droplet, the thickness "t" is given by the following equation (2) when the radius of the spherical liquid droplet is "r".

$$t \approx 0.7\times(2r) \quad (2)$$

On the other hand, the thickness "$t_1$" at which the optical path length difference is λ/4 is given by the following equation (3)

$$t_1=\lambda/[4(n-1)] \quad (3)$$

Further, the thickness "$t_2$" at which the optical path length difference is λ/8 is given by the following equation (4)

$$t_2=\lambda/[8(n-1)] \quad (4)$$

Herein, the "n" is a refractive index of a liquid droplet to the light, and when the liquid droplet is an approximately water droplet, the value is around 1.5 in the visible light region.

For this reason, in a case where a liquid droplet is attached onto an optical member that is a light transmission type and hydrophobic, the minimum size of the liquid droplet (diameter 2r) at which the influence of light scattering is observed is 0.7λ from the equations (2) and (3).

In addition, in a case where a liquid droplet is attached onto an optical member that is a light reflection type and hydrophobic (for example, a hydrophobic mirror), the minimum size of the liquid droplet (diameter 2r), at which the influence of light scattering is observed is 0.35λ from the equations (2) and (4).

When the light to be targeted is not monochromatic light but polychromatic light or broadband light, the size (diameter 2r) of the liquid droplet that is required to be detected to prevent the light scattering is $0.7\lambda_{min}$ in a case where the liquid droplet is attached onto an optical member that is a light transmission type, and $0.35\lambda_{min}$ in a case where the liquid droplet is attached onto an optical member that is a light reflection type. In this regard, $\lambda_{min}$ is the minimum wavelength of the light to be targeted.

In a case where light scattering becomes a problem when viewed with the naked eye, the size of the liquid droplet is as follows. Since the minimum wavelength that is felt by eyes is around 400 nm, the size (diameter 2r) of the liquid droplet that is required to be detected to prevent light scattering is 280 nm when the liquid droplet is attached onto an optical member that is a light transmission type and hydrophobic, and 140 nm when the liquid droplet is attached onto an optical member that is a light reflection type.

Further, for example, in a case of imaging an image by using ultraviolet light with a minimum wavelength of 300 nm, the size (diameter 2r) of the liquid droplet that is required to be detected to prevent light scattering is 210 nm when the liquid droplet is attached onto an optical member that is a light transmission type and hydrophobic, and 105 nm when the liquid droplet is attached onto an optical member that is a light reflection type.

Furthermore, for example, in a case of imaging an image by using infrared light with a wavelength of 1000 nm, the size (diameter 2r) of the liquid droplet that is required to be detected to prevent light scattering is 700 nm when the liquid droplet is attached onto an optical member that is a light transmission type and hydrophobic, and 350 nm when the liquid droplet is attached onto an optical member that is a light reflection type.

When a liquid droplet is attached onto an optical member having hydrophilic properties, the liquid droplet has a flatter shape by the interfacial tension between the optical member and the liquid droplet. On the other hand, if the hydrophilicity is sufficiently high, a liquid film is formed rather than liquid droplets. As a result of detailed examination, the minimum film thickness at which a liquid droplet is formed rather than a liquid film is 1/10 of the thickness when the liquid droplet becomes spherical. When the film thickness is smaller than this thickness, a liquid droplet comes in contact with adjacent liquid droplets to form a liquid film.

When the radius of a liquid droplet is taken as $r_{disk}$, at which the liquid droplet is attached onto an optical member having hydrophilic properties, and a flat liquid droplet is formed, in a case where the liquid droplet is attached onto a light-transmission type optical member when the thickness of the flat liquid droplet is 1/10 of the spherical thickness, the minimum size of the liquid droplet (diameter $2r_{disk}$), at which influence of light scattering is observed, is $7\lambda$. Further, in a case where the liquid droplet is attached onto an optical member that is a light reflection type, the minimum size of the liquid droplet (diameter $2r_{disk}$), at which influence of light scattering is observed, is $3.5\lambda$. As described above, in a case where the light to be targeted is not monochromatic light but polychromatic light or broadband light, the minimum size of the liquid droplet is $7\lambda_{min}$ in a case where the liquid droplet is attached onto an optical member that is a light transmission type, and is $3.5\lambda_{min}$ in a case where the liquid droplet is attached onto an optical member that is a light reflection type.

Therefore, the size (diameter) of a fine liquid droplet that is required to be detected to prevent light scattering due to dew condensation is 20 nm or more and $0.7\lambda_{min}$ or less in a harsh environment and 40 nm or more and $0.7\lambda_{min}$ or less in a normal environment in a case where a liquid droplet is attached onto a hydrophobic optical member, and the optical member is a transmission-type optical member, and is 20 nm or more and $0.35\lambda_{min}$ or less in a harsh environment and 40 nm or more and $0.35\lambda_{min}$ or less in a normal environment in a case where a liquid droplet is attached onto a hydrophobic optical member, and the optical member is a reflection-type optical member.

Further, when a liquid droplet is attached onto a hydrophilic optical member, the size (diameter) of the liquid droplet is 20 nm or more and $7\lambda_{min}$ or less in a harsh environment and 40 nm or more and $7\lambda_{min}$ or less in a normal environment in a case where the optical member is a transmission-type optical member, and is 20 nm or more and $3.5\lambda_{min}$ or less in a harsh environment and 40 nm or more and $3.5\lambda_{min}$ or less in a normal environment in a case where the optical member is a reflection-type optical member.

(Dew Condensation Prevention System)

As shown in FIG. 1, the dew condensation prevention system includes a fine-liquid-droplet detection means (fine-liquid-droplet sensor) 1, a control means 2, and a fine-liquid-droplet removing means 3.

In the dew condensation prevention system, the fine liquid droplet before the generation of dew condensation is detected by the fine-liquid-droplet detection means 1, and the information (signal) is sent to a control means 2. The control means 2 makes the fine-liquid-droplet removing means 3 work preventively as needed on the basis of the information to start the removal of the fine liquid droplet. As the method for removing a fine liquid droplet, heating, introduction of dry air, introduction of dry nitrogen, or the like can be mentioned. Further, the mechanism of the fine liquid droplet removal may be provided with a local fine-liquid-droplet removal mechanism with which removal of the fine liquid droplet is performed separately for each location.

The fine-liquid-droplet detection means 1 may include not only one fine-liquid-droplet sensor, but also multiple fine-liquid-droplet sensors 1a, 1b, . . . , and 1n (n is an integer). The dew condensation prevention system is simplified in a case where one fine-liquid-droplet sensor is used.

Figure 2:
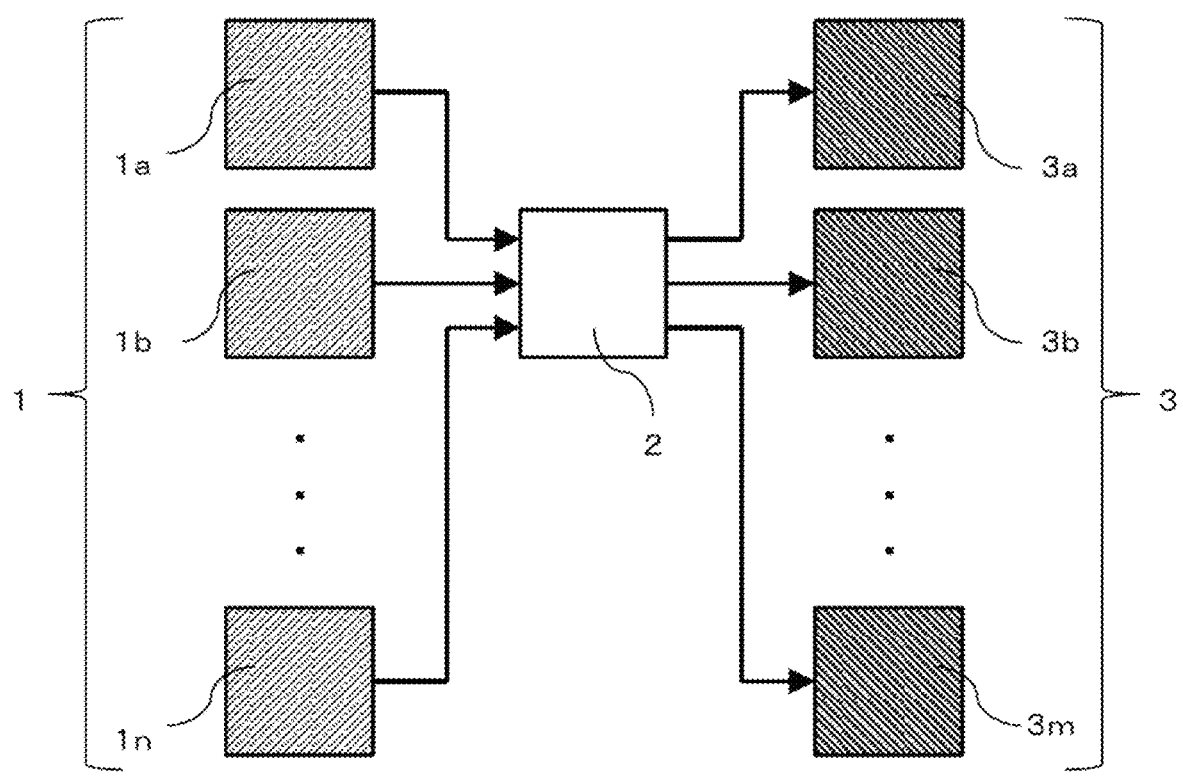
FIG. 2 is a conceptual diagram showing a second system configuration of the present invention.

In a case where multiple fine-liquid-droplet sensors 1a, 1b, . . . , and 1n are used, and sensors for detecting liquid droplets having the same sizes as each other are arranged at various places (see FIG. 2), by a control means 2 on the basis of the information from each sensor, local fine-liquid-droplet removal can be performed preferentially from a place where generation of dew condensation is immediately before the start by fine-liquid-droplet removing means 3 (3a, 3b, . . . , and 3m (m is an integer)). Herein, "n" and "m" may be the same numbers as or different numbers from each other.

Figure 3:
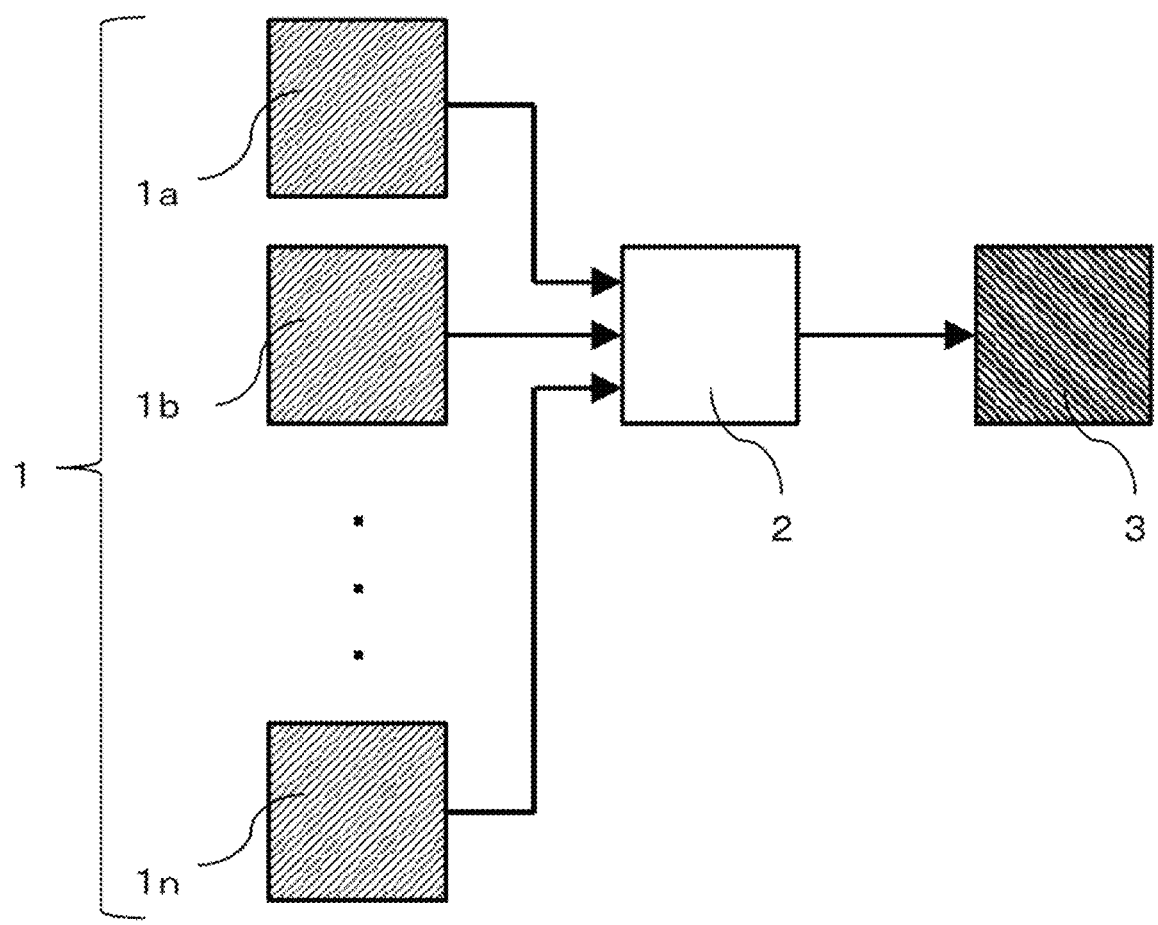
FIG. 3 is a conceptual diagram showing a third system configuration of the present invention.

Further, in a case where multiple fine-liquid-droplet sensors 1a, 1b, . . . , and 1n for detecting liquid droplets having different sizes from each other are arranged in one place as one group (see FIG. 3), the growth process from an extremely fine liquid droplet to a liquid droplet having a size before dew condensation can be monitored, and as a result of which the growth rate of a liquid droplet can be calculated. Furthermore, the fine-liquid-droplet removal can be performed by reflecting the liquid droplet growth situation, for example, the fine-liquid-droplet removal can be performed more efficiently (in an energy saving manner) by changing the strength of dehumidification, or the like. In addition, by arranging a group of fine-liquid-droplet sensors for detecting liquid droplets having different sizes from each other in multiple places, the fine-liquid-droplet removal can be performed more finely and efficiently. In any one of the cases, dew condensation can be prevented in a state in which the energy saving performance is excellent.

Figure 4:
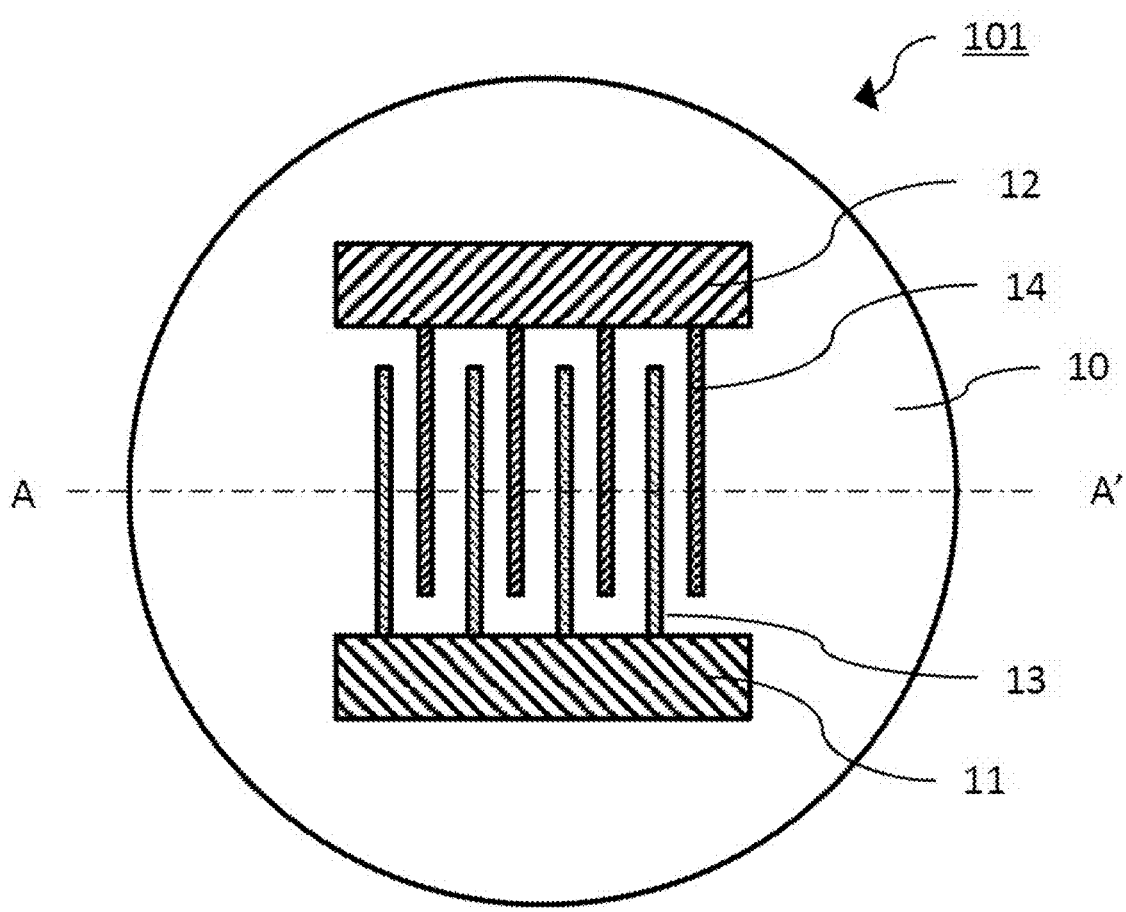
FIG. 4 is a plan view showing a fine-liquid-droplet detection means (sensor).
Figure 5:
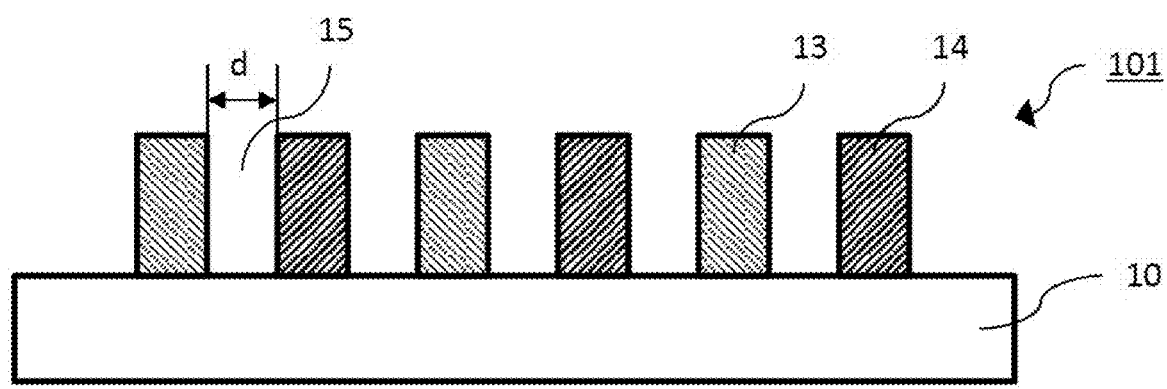
FIG. 5 is a sectional view showing a fine-liquid-droplet detection means (sensor).

As shown in FIGS. 4 and 5, in a fine-liquid-droplet detection means 1 (fine-liquid-droplet sensor 101), a first thin wire 13 made of a first metal, and a second thin wire 14 made of a second metal different from the first metal or a semiconductor are disposed in juxtaposition with each other on an insulating substrate 10. A spacing (inter-thin wire distance) "d" between the first thin wire and the second thin wire is set to a size (diameter) or less of the fine liquid droplet before dew condensation, specifically, a spacing between thin wires is set in a range of 20 nm or more and 10000 nm or less. The most suitable spacing between thin wires according to application for prevention of mold generation, prevention of dew condensation, prevention of light scattering, or the like will be described later. FIG. 4 is a top view of the fine-liquid-droplet sensor 101, and FIG. 5 is a sectional view of a part connecting between A and A' in FIG. 4.

As the insulating substrate 10, a silicon substrate on a surface of which a silicon oxide film ($SiO_2$ film) has been formed, or the like can be preferably used, but the insulating substrate 10 is not limited to the silicon substrate, and a variety of insulating materials, for example, a plastic such as polycarbonate, rubber, and others can also be used. Further, as the substrate main body, even if the substrate is a conductor made of a metal or the like, when the substrate becomes to have insulation properties as viewed from electrodes by forming an insulating coating, covering, or the like on a surface of the substrate, the substrate is also included in the category of "insulating substrate" in the present application.

The first thin wire 13 is connected to a first electrode 11, the second thin wire 14 is connected to a second electrode 12, and electric signals are transmitted to a control means 2 through electrical wiring (not shown) connected to the first and second electrodes. The transmission of the electric signals to the control means 2 may be wired or wireless. Furthermore, an amplifier is connected to the first electrode and the second electrode to amplify a galvanic current flowing due to the presence of a liquid droplet, and thus electrical signals may be transmitted to the control means 2.

A gap 15 between the first thin wire 13 and the second thin wire 14 may be a space, or may be filled with an insulating material. In a case where the gap is a space, a puddle is generated when a fine liquid droplet is formed in the space, and further when the gap is filled with an insulating material, a fine liquid droplet is deposited on the insulating material. The shape of the deposited liquid droplet can be controlled by the water repellency (contact angle of a liquid droplet) on a surface of the insulating material.

By using a first metal and a second metal having an electrochemical potential different from that of the first metal, when the first metal and the second metal are connected by a conductive liquid droplet, a galvanic current flows due to the galvanic action. Water has low conductivity and is insulative in a state of ultrapure water, however, if a minute amount of electrolytic component is contained by hydrogen ions and hydroxide ions, which are present at least at $10^{-7}$ mol/L, respectively, a contamination, or the like, a measurable galvanic current flows in water in the use state. Further, in a case where a semiconductor such as titanium oxide is used as the second thin wire, a difference in electrochemical potential is generated due to the photoelectric effect when light falls on the semiconductor, and a current flows between the first thin wire and the second thin wire which are connected by a conductive liquid.

When the length of the part where the first thin wire and the second thin wire are adjacent and opposed to each other is increased, the battery capacity is increased, and therefore, it is effective for increasing the galvanic current. Accordingly, a structure in which such electrodes are thinned and arranged in parallel with each other over a long distance or the like may be employed. As a configuration for increasing a length (hereinafter, referred to as a parallel running distance) of approached portions between thin wires (electrodes) by arranging such thin wires in parallel with each other, for example, a comb structure or a double spirally-wound structure may be employed. In addition, a structure itself for increasing a parallel running distance between two thin wires inside a predetermined plane area as possibly as can be is well known in the field of a semiconductor device and the like, and thus, such a structure may be employed as is necessary. In the present invention, "juxtaposing electrodes on a substrate" is not for specifying mutual directions of a plurality of electrodes placed on the substrate but represents that the electrodes are arranged on a same plane of the substrate with being separate from each other.

In a case where the first thin wire 13 is used as a cathode, examples of the material for the first thin wire 13 include gold (Au), platinum (Pt), silver (Ag), titanium (Ti), an alloy thereof, and carbon (C) and an allotrope thereof. In a case where the second thin wire 14 is used as an anode, examples of the material for the second thin wire 14 include silver (Ag), copper (Cu), iron (Fe), zinc (Zn), nickel (Ni), cobalt (Co), aluminum (Al), tin (Sn), chromium (Cr), molybdenum (Mo), manganese (Mn), magnesium (Mg), and an alloy thereof. It should be noted that, in a case where silver and an alloy thereof are used as the first thin wire 13, a material other than silver and an alloy thereof is used as the material for the second thin wire 14.

The sensor output (current) depends on the combination of metal materials for the thin wires. For example, when the combinations of silver/iron and gold/silver are compared with each other, the current value to be obtained in the combination of silver/iron is larger than that in the combination of gold/silver because the combination of silver/iron has a corrosion rate per area larger than that in the combination of gold/silver. On the other hand, in the combination of gold/silver, the service life is longer because the combination of gold/silver has smaller consumption of the electrodes. In this regard, silver has an effect of preventing the generation of mold on a fine-liquid-droplet sensor 101, and therefore, it is preferable to use silver as the first thin wire or the second thin wire. Further, if the first electrode 11 is made of the same material as that of the first thin wire 13, and the second electrode 12 is made of the same material as that of the second thin wire 14, the production process of the fine-liquid-droplet sensor 101 is simplified, and therefore, this is preferable.

In the fine-liquid-droplet detection sensor 101, when a galvanic current flows repeatedly, the metal of the anode electrode which is the second thin wire is ionized, and accordingly, the anode electrode (second thin wire) is gradually consumed. In addition, in a case where a long-term use under an environment having high humidity and a large salt damage is assumed, particularly, in a fine-liquid-droplet detection sensor 101 having thin electrodes for increasing the laying density, there is a possibility that the inter-thin wire distance "d" (inter-electrode distance) is gradually increased or the thin wire is cut out in accordance with the consumption of the anode electrode.

In order to address these problems with the laying density of the thin wires maintained, for example, the thickness of the anode electrode may be increased, or the width of the anode electrode may be increased instead of the width of the cathode electrode (first thin wire) may be decreased. In a case where the inter-thin wire distance "d" is very short, the influence of a slight increase in the inter-thin wire distance according to the consumption of the anode electrode on a result of the measurement increases. In a case where such an influence matters, for example, by using a principle that the consumption of the metal of the anode electrode is in proportion to the time integral of a galvanic current, a countermeasure of performing compensation calculation for the result of the measurement as the whole measurement system may be established.

In a fine-liquid-droplet detection means 1 (fine-liquid-droplet sensor 101), a spacing "d" between the first thin wire and the second thin wire is extremely important, and the spacing is required to be at least smaller than the size (diameter) of the liquid droplet to be detected for the prevention to the above problems. On the other hand, the lower limit of the spacing is determined by the size (diameter) of the liquid droplet to start the detection.

In the above, the spacing "d" between the first thin wire and the second thin wire is set in a range of 20 nm or more and 10000 nm or less, and is more preferably in the following range depending on the purpose of preventing dew condensation.

In a case of preventing dew condensation, the spacing "d" is in a range of 20 nm or more and 10000 nm or less in a harsh environment and 40 nm or more and 10000 nm or less in a normal environment, preferably, 20 nm or more and 5000 nm or less in a harsh environment and 40 nm or more and 5000 nm or less in a normal environment, and more preferably 20 nm or more and 3000 nm or less in a harsh environment and 40 nm or more and 30000 nm or less in a normal environment.

In a case of preventing mold, the spacing "d" is in a range of 20 nm or more and 2000 nm or less in a harsh environment, and 40 nm or more and 20000 nm or less in a normal environment.

In a case of preventing light scattering due to dew condensation, the spacing "d" is in a range of 20 nm or more and $0.7\lambda_{min}$ or less in a harsh environment and 40 nm or more and $0.7\lambda_{min}$ or less in a normal environment when the optical member is hydrophobic and a transmission type, and the spacing "d" is in a range of 20 nm or more and $0.35\lambda_{min}$ or less in a harsh environment and 40 nm or more and $0.35\lambda_{min}$ or less in a normal environment when the optical member is hydrophobic and a reflection-type. The spacing "d" is in a range of 20 nm or more and $7\lambda_{min}$ or less in a harsh environment and 40 nm or more and $7\lambda_{min}$ or less in a normal environment when the optical member is hydrophilic and a transmission type, and the spacing "d" is in a range of 20 nm or more and $3.5\lambda_{min}$ or less in a harsh environment and 40 nm or more and $3.5\lambda_{min}$ or less in a normal environment when the optical member is hydrophilic and a reflection-type optical member.

In this regard, generally, the processing limit in producing the spacing between thin wires changes with the processing generation, and is several nanometers in the present situation, and the minimum spacing between thin wires is at a process level capable of being sufficiently prepared.

As the inter-thin wire distance "d" is decreased, conductive fine particles such as metal powders present in the air and the like are attached between the thin wires, and accordingly, a possibility of forming a short circuit increases. Regarding this problem, by setting up a countermeasure as below, the occurrence of the problem can be prevented.

(1) By arranging a meshed body on the front face of the thin wires (electrodes), fine particles do not arrive at the thin wires.

(2) An insulating protection film of a silicon oxide or the like, which has fine openings exposing at least a part of each thin wire (in addition, at least a part of the gap between the thin wires, as needed) and covering the other parts, is arranged on a surface of the fine-liquid-droplet sensor 101. With this configuring, even when conductive fine particles are attached near the entrance of the fine opening portion of the insulating protection film, the fine openings prevent the particles from directly contacting the thin wire and causing a short circuit, since the thin wire (electrode) is positioned deep in the opening by the thickness of the insulating protection film.

(3) An approach from the aspect of the sensor system can be employed in which, for example, though the fine-liquid-droplet sensor 101 itself having a structure according to the present invention is used, a plurality of such fine-liquid-droplet sensors 101 are arranged closely to each other, and the fine-liquid-droplet sensors 101 in which a short circuit between the first thin wire and the second thin wire is detected or from which no output current is detected while output currents are detected from other sensors is excluded from the measurement system (electrically disconnected, the measured value of the output current not used with the electric connection unchanged, etc.).

As another modified embodiment of the fine-liquid-droplet sensor 101 according to the present application, following one can be mentioned. For example, in the structure of fine-liquid-droplet sensor 101 structure described above, while a substrate to which a metal is not attached is present in the gap between the first thin wire 13 (cathode electrode) and the second thin wire 14 (anode electrode), by removing the substrate of the gap portion through etching or the like, the air may be configured to be allowed to flow between the first thin wire and the second thin wire while water is not attached to the sensor. More specifically, for example, by removing at least a part of positions corresponding to the gap between the thin wires, an opening portion passing through the front and rear sides of the substrate is arranged. In this regard, by completely removing the substrate of the gap portion, in a case where the mechanical strength is decreased or in a case where an eigenfrequency is included for which there is a risk of the occurrence of a trouble according to resonance with a mechanical vibration applied from the outside under a use environment, a countermeasure such as configuring the substrate of a part of the gap portion to remain or the like is established.

As compared with a humidity sensor of the type that measures the dry and wet state through the process of water absorption to the conventional dryness and wetness responsive material, the fine-liquid-droplet sensor 101 according to the present invention has higher responsiveness because a fine liquid droplet attached onto a sensor surface from the air can be directly detected, and is suitable for preventing dew condensation with the higher responsiveness. Further, an external electric power for driving the sensor is not required, and therefore, the dew condensation can be prevented in an energy saving manner.

EXAMPLES

Example 1

In Example 1, an example of the fine-liquid-droplet sensor 101 in which two electrodes are arranged in a comb shape will be described. It is understood that the present invention is not limited to such a specific form, and it should be noted that the technical scope of the present invention is defined by claims.

Figure 6:
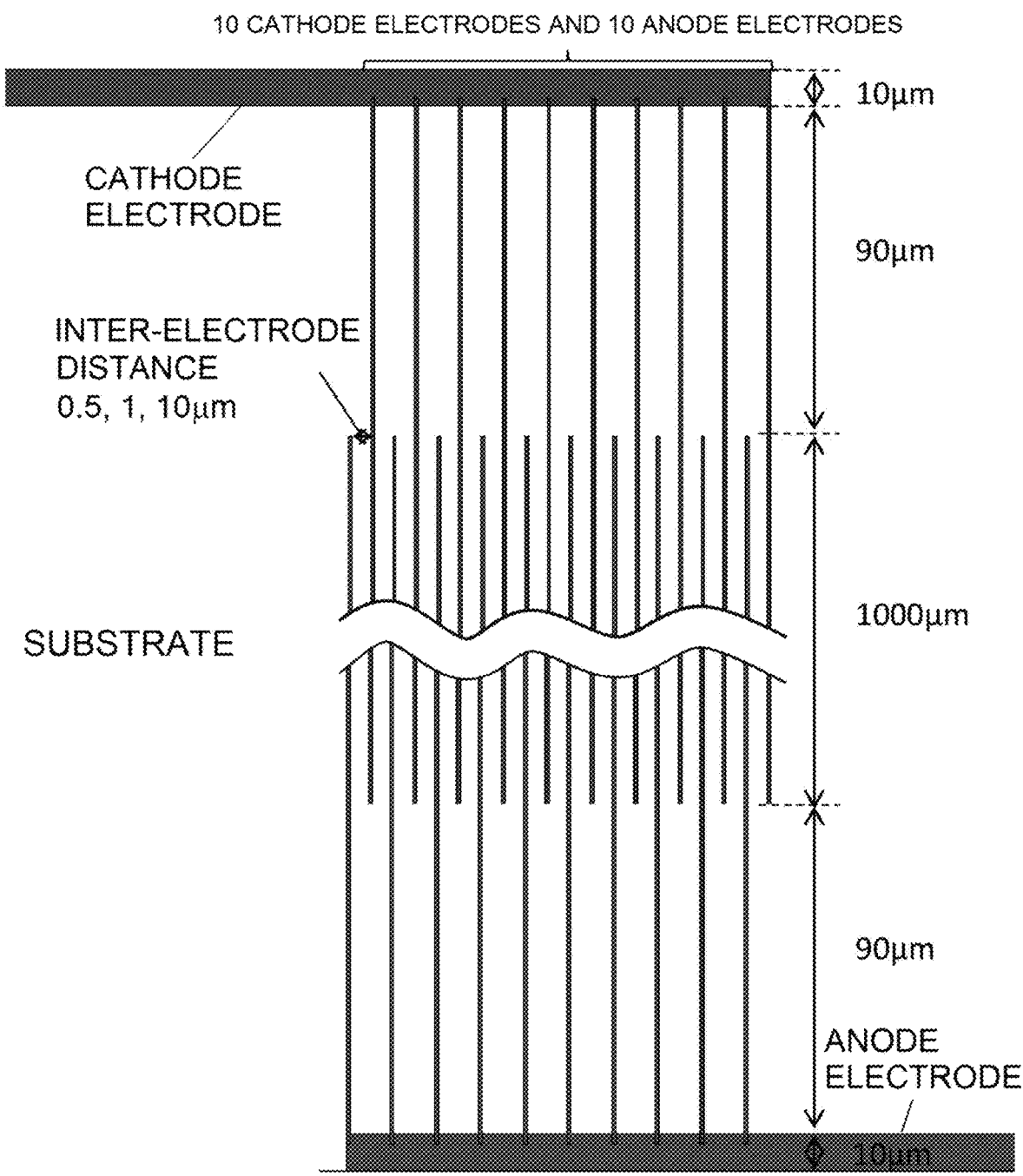
FIG. 6 is a plan view showing an example of electrode arrangement of a fine-liquid-droplet detection means (sensor).

As shown in FIG. 6, a fine-liquid-droplet sensor 101 in which a cathode electrode made of gold (Au) as a first thin wire and an anode electrode made of copper (Cu) as a second thin wire were arranged in a comb shape on a silicon wafer with a silicon oxide film was produced.

In the cathode electrode and the anode electrode, while a side close to a signal lead terminal (not illustrated in the drawing) of the fine-liquid-droplet sensor 101 for the outside is unified as one to be a concentrated portion (the upper and lower sides in FIG. 6 are denoted by thick lines running in the horizontal direction), the concentrated portion branches into a plurality of parts near each terminal end portion. In the embodiment illustrated in FIG. 6, ten branches of each electrode are disposed. The branching cathode electrodes and the branching anode electrodes extend in a parallel direction (more specifically, an antiparallel direction; hereinafter, simply referred to as a parallel direction) and, for most of the extended distance, run parallel in the parallel direction with approaching each other.

In this embodiment, the concentrated portions of the cathode electrode and the anode electrode extend in the antiparallel direction with being separate by 1180 μm, and each branching portion extends by 1090 μm toward an opposing concentrated portion. Each thin wire of the branching portion runs parallel in a direction parallel to the thin wire of the extended portion of the opposite side over 1000 μm except for 90 μm of the root portion.

As a gap (a separation distance between the branching thin wire of the cathode electrode and the branching thin wire of the anode electrode) between both the electrodes of this parallel running portion, in this embodiment, three distances of 0.5 μm, 1 μm, and 10 μm were produced. In this embodiment, ten branching thin wires of the cathode electrode and ten branching thin wires of the anode electrode run parallel over 1000 μm. Since there are 19 parallel running sites (gaps between the branching thin wires of the cathode electrode and the anode electrode) between the branching thin wires, a total parallel running distance is 1000 μm×19=19 mm.

Figure 7:
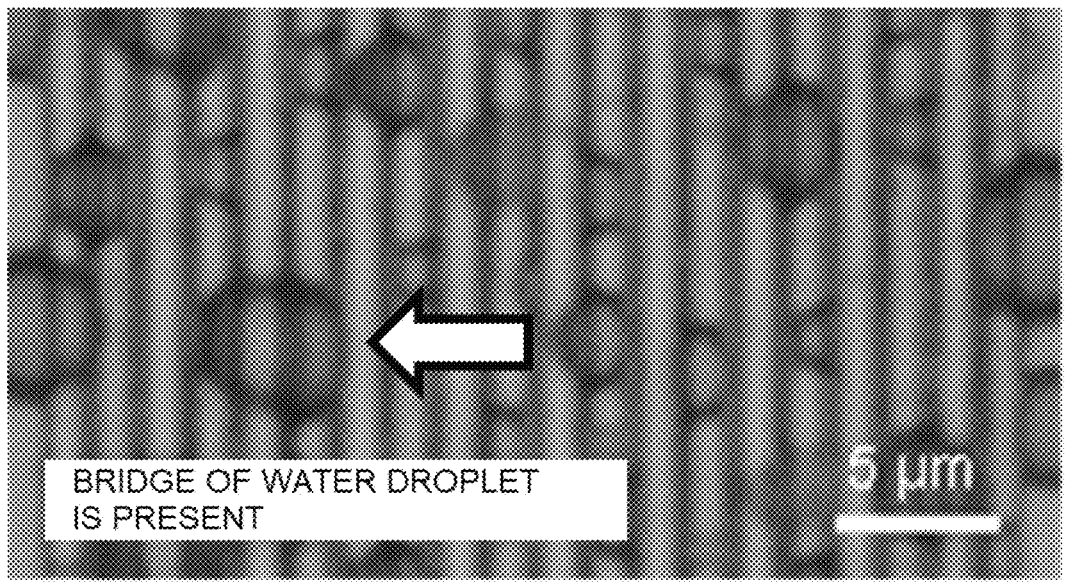
FIG. 7 is an explanatory diagram when a fine liquid droplet is measured by a fine-liquid-droplet detection means (sensor) of the present invention when the inter-thin wire distance is 0.5 µm, and shows an optical microscope image on the sensor, and a current measurement result.
Figure 7:
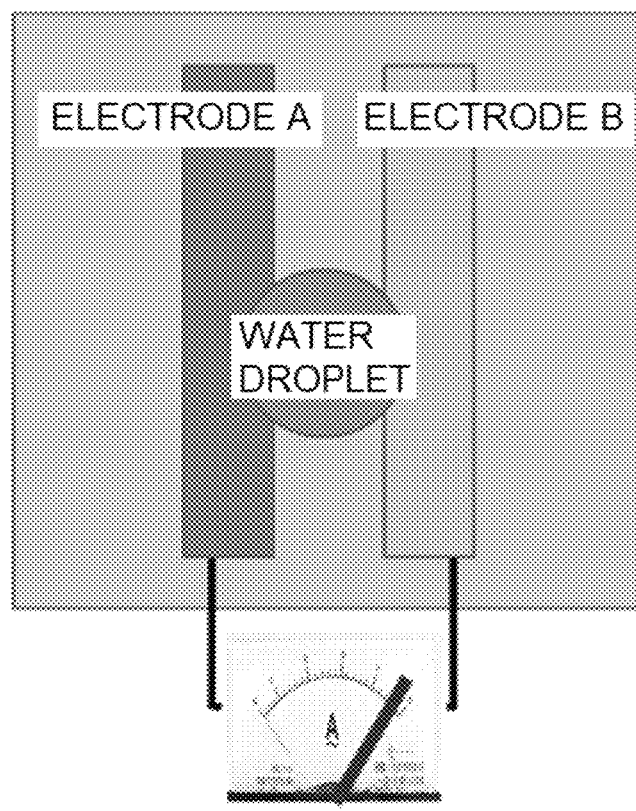
Figure 8:
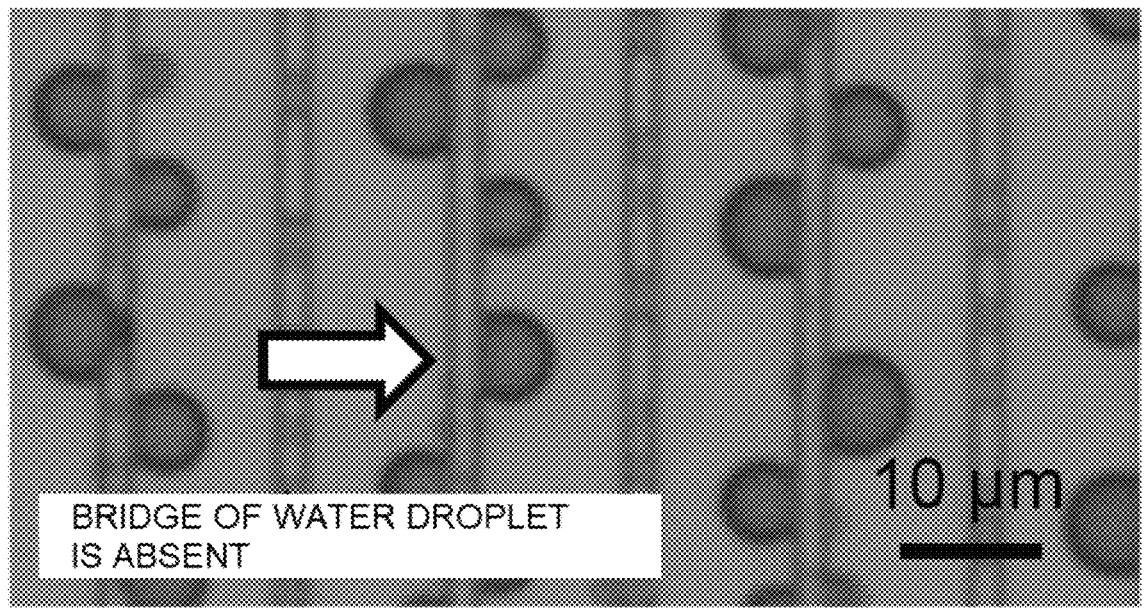
FIG. 8 is an explanatory diagram when a fine liquid droplet is measured by a fine-liquid-droplet detection means (sensor) of the present invention when the inter-thin wire distance is 10 µm, and shows an optical microscope image on the sensor, and a current measurement result.
Figure 8:
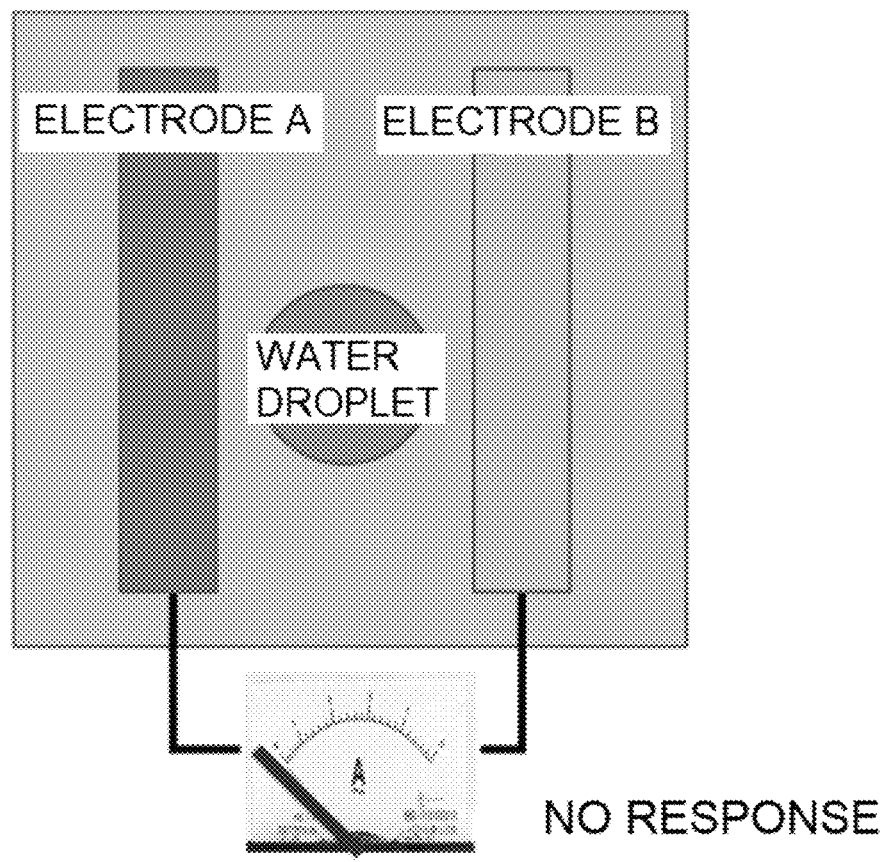

Next, by dropping down water to the fine-liquid-droplet sensor 101 produced in this way, a change in the flowing current was measured. Actually-measured data in cases where the inter-thin wire distance "d" is 0.5 μm and 10 μm are illustrated in FIGS. 7 and 8, respectively. The photographs on the upper sides in FIGS. 7 and 8 are optical microscope photographs each showing the state of liquid droplets attached onto the fine-liquid-droplet sensor 101, and the drawings on the lower sides in FIGS. 7 and 8 are drawings each schematically showing the current measurement. As a result, in a case where the inter-thin wire distance "d" was 0.5 μm, a current of 10 nA was observed. On the other hand, in a case where the distance "d" between thin wires was 10 μm, which was Comparative Example, the current value was 1 pA or less that was lower than the measurable lower limit, and no current was observed.

As described above, in the embodiment illustrated in FIG. 6, while the number of each of the cathode electrodes and the anode electrodes is 10, considering to lay electrodes as possibly as can between a certain length (range), the laying density of the electrodes can be estimated as below.

When the width of the thin wire itself is 1 μm, and the number of pairs of thin wires is n, in an inter-thin wire distance of 10 μm, the laying width is calculated as 2n+10×(2n−1)=22n−10 μm. Similarly, in the inter-thin wire distances of 1 μm and 0.5 μm, the laying widths are respectively 4n−1 μm and 3n−0.5 μm. Accordingly, when the inter-thin wire distance of 10 μm is used as the reference, the ratio of the number of pairs to the same laying width for 1 μm is (22n−10)/(4n−1)=(22−10/n)/(4−1/n) and, when n is sufficiently large (for example, 100 or more), a fraction having the denominator of n can be regarded as zero, and thus, 22/4=5.5. For 0.5 μm, the value of this ratio is 22/3=7 through similar calculation. In consideration of the average value of the current acquired in the embodiment, for the same laying width, when the inter-thin wire distance of 10 μm is changed to 1 μm and 0.5 μm, we can say the output becomes 11 times and 14 times as large, respectively. Since the S/N ratio of 1:100 or more is obtained even for the conventional measurement system, we can say that the experimentally produced sensor of the above embodiment can also perform the sensing without amplification or noise filtering. When the width of the thin wire itself is configured to be narrower (thinner), the number of pairs for the same laying width is increased, allowing the output to be further improved.

Example 2

Example 2 is an example in which a dew condensation prevention system was produced by using the fine-liquid-droplet sensor 101 produced in Example 1, and the details will be described below.

As shown in FIG. 1, the dew condensation prevention system of Example 2 includes a fine-liquid-droplet detection means 1, a control means 2, and a fine-liquid-droplet removing means 3. In this regard, as the fine-liquid-droplet detection means, a fine-liquid-droplet detection sensor 101 in which a spacing between a first thin wire 13 and a second thin wire 14 was 5 μm was used. As the fine-liquid-droplet removing means 3, a dehumidifying function by an air conditioner was used.

The control means 2 had a signal amplification function of amplifying the signal from the fine-liquid-droplet detection sensor 101, a function of subjecting the signal to digital processing and determining the presence or absence of a fine liquid droplet, and a function of starting the air conditioner that was the fine-liquid-droplet removing means 3 in a case where a fine liquid droplet was detected and sending a signal to stop the air conditioner in a case where a fine liquid droplet was not detected.

When fine liquid droplets each having a diameter of 5 μm or more were sprayed in test evaluation, the fine-liquid-droplet detection sensor 101 detected the fine liquid droplet, and the air conditioner was started.

When the dew condensation prevention system of Example 2 was arranged in a room, dew condensation was not observed in the room including window glass.

Example 3

In Example 3, a dew condensation prevention system produced in Example 2 was arranged in a room, and it was evaluated on the basis of whether mold was generated or not on a wall of the room. As a result, mold was not observed.

Example 4

Example 4 was an example in which a dew condensation prevention system produced in Example 2 was applied to a surveillance camera placed in the open air, and the details will be described below. In this regard, in Example 4, unlike in the case of Example 1, hot air generated by a heater was used in place of the air conditioner as the fine-liquid-droplet removing means 3.

This surveillance camera converts an image formed by an optical lens into a video signal by a complementary metal oxide semiconductor (CMOS) image sensor having sensitivity to visible light and near infrared light. The optical lens was provided with a long hood such that water droplets due to rain or the like were not attached onto the optical lens. This surveillance camera was arranged in a place where the state was usually in a dry state but occasionally a fog was generated. Further, a light-emitting diode (LED) lamp and an infrared ray lamp were arranged in the place for the nighttime. As a result, even though the heater that was the fine-liquid-droplet removing means 3 operated only a little, reduction due to lens fogging in the image contrast, image distortion due to dew condensation, and the like were not occurred at all, and the monitoring was able to be performed with a high-quality image all day.

INDUSTRIAL APPLICABILITY

As described above, according to the present invention, mold, dew condensation, and light scattering that is generated due to the mold and dew condensation can be prevented. Moreover, the detection unit (sensor) that detects these signs is highly sensitive with a small size, and further does not require any electric power for driving the sensor, and therefore, the present invention can be applied in many industrial fields where the prevention of these events is considered to be important.

REFERENCE SIGNS LIST

1, 1a, 1b, 1n: fine-liquid-droplet detection means (fine-liquid-droplet sensor)
2: control means
3, 3a, 3b, 3m: fine-liquid-droplet removing means
10: insulating substrate
11: first electrode
12: second electrode
13: first thin wire 14: second thin wire
15: gap
101: fine-liquid-droplet sensor (fine-liquid-droplet detection means)

The invention claimed is:

1. A method for preventing dew condensation on a surface of an object comprising:
   a step of detecting a fine liquid droplet capable of causing dew condensation on the surface of the object by detecting a fine liquid droplet on a detection means, the detection means being driven without an electric power, and
   a step of removing the fine liquid droplet faun the surface of the object on the basis of the detection of the fine liquid droplet on the detection means by a removing means to thereby prevent dew condensation, the removing means being different from the detection means, wherein,
   the method comprises a plurality of the detection means for detecting different sizes of the fine liquid droplet, wherein the plurality of the detection means is arranged ire one place as one group,
   a growth process of the fine liquid droplet from a stage where the fine liquid droplet is generated to a stage where the fine liquid droplet has a size before dew condensation is monitored with the plurality of the detection means, and a growth rate of the fine liquid droplet is calculated therefrom, and
   the removing step is performed at a predetermined stage of the fine liquid droplet growth process by reflecting the growth rate of the fine liquid droplet; and wherein,
   the detection means comprises:
   a first thin wire made of a first metal, and
   a second thin wire made of a second metal or a semiconductor, the second metal being different from the first metal,
   wherein the first thin wire and the second thin wire are disposed in juxtaposition with each other on an insulating substrate,
   wherein a spacing between the first thin wire and the second thin wire is in a range of 20 nm or more and 10000 nm or less, and
   wherein the detection means detects the fine liquid droplet by detecting a galvanic current in response to a fine liquid droplet bridging the first thin wire and the second thin wire.

2. The method for preventing dew condensation on a surface of an object according to claim 1, wherein the detection means comprises a plurality of at least one selected from the group consisting of the first thin wire and the second thin wire, and
   wherein the first thin wire extends from a first side towards a second side that is opposite to the first side and the second thin wire extends from the second side towards the first side such that the first thin wire and the second thin wire run in parallel.

3. The method for preventing dew condensation on a surface of an object according to claim 1, wherein the first thin wire and the second thin wire are arranged in a double spiral.

4. The method for preventing dew condensation on a surface of an object according to claim 1, wherein the insulating substrate is a silicon substrate with a silicon oxide film on its surface.

5. The method for preventing dew condensation on a surface of an object according to claim 1, wherein the first metal is selected from a group consisting of gold, platinum, silver, titanium, an alloy thereof, and carbon.

6. The method for preventing dew condensation on a surface of an object according to claim 1, wherein the second metal is selected from a group consisting of silver, copper, iron, zinc, nickel, cobalt, aluminum, tin, chromium, molybdenum, manganese, magnesium, and an alloy thereof.

7. The method for preventing dew condensation on a surface of an object according to claim 1, wherein the spacing between the first thin wire and the second thin wire is in a range of 20 nm or more and 5000 nm or less.

8. The method for preventing dew condensation on a surface of an object according to claim 1, wherein the spacing between the first thin wire and the second thin wire is in a range of 20 nm or more and 2000 nm or less.

9. The method for preventing dew condensation on a surface of an object according to claim 1, wherein the fine liquid droplet is removed from the surface of the object by heating.

10. The method for preventing dew condensation on a surface of an object according to claim 1, wherein the fine liquid droplet is removed from the surface of the object by dry gas supplying.

11. A system for preventing dew condensation on a surface of an object comprising:
    a detection means for detecting a fine liquid droplet capable of causing dew condensation on the surface of the object by detecting a fine liquid droplet on the detection means, the detection means being driven without an electric power,
    a removing means for removing the fine liquid droplet from the surface of the object to thereby prevent dew condensation, the removing means being different from the detection means, and
    a control means for controlling the removing means on the basis of information from the detection means, wherein the information includes the detection of the fine liquid droplet on the detection means, wherein,
    the system comprises a plurality of the detection means for detecting different sizes of the fine liquid droplet, wherein the plurality of the detection means is arranged in one place as one group,
    the plurality of the detection means is configured to monitor a growth process of the fine liquid droplet from a stage where the fine liquid droplet is generated to a stage where the fine liquid droplet has a size before dew condensation, and to calculate therefrom a growth rate of the fine liquid droplet, and
    the control means is configured to control the removal of the fine liquid droplet by the removing means at a predetermined stage of the fine liquid droplet growth process by reflecting the growth rate of the fine liquid droplet; and wherein,
    the detection means comprises:
    a first thin wire made of a first metal, and
    a second thin wire made of a second metal or a semiconductor, the second metal being different from the first metal,
    wherein the first thin wire and the second thin wire are disposed in juxtaposition with each other on an insulating substrate,
    wherein a spacing between the first thin wire and the second thin wire is in a range of 20 nm or more and 10000 nm or less, and wherein the detection means detects the fine liquid droplet by detecting a galvanic current in response to a fine liquid droplet bridging the first thin wire and the second thin wire.

12. The system for preventing dew condensation on a surface of an object according to claim 11, wherein the detection means comprises a plurality of at least one selected from the group consisting of the first thin wire and the second thin wire, and
wherein the first thin wire extends from a first side towards a second side that is opposite to the first side and the second thin wire extends from the second side towards the first side such that the first thin wire and the second thin wire run in parallel.

13. The system for preventing dew condensation on a surface of an object according to claim 11, wherein the first thin wire and the second thin wire are arranged in a double spiral.

14. The system for preventing dew condensation on a surface of an object according to claim 11, wherein the insulating substrate is a silicon substrate with a silicon oxide film on its surface.

15. The system for preventing dew condensation on a surface of an object according to claim 11, wherein the first metal is selected from a group consisting of gold, platinum, silver, titanium, an alloy thereof, and carbon.

16. The system for preventing dew condensation on a surface of an object according to claim 11, wherein the second metal is selected from a group consisting of silver, copper, iron, zinc, nickel, cobalt, aluminum, tin, chromium, molybdenum, manganese, magnesium, and an alloy thereof.

17. The system for preventing dew condensation on a surface of an object according to claim 11, wherein the spacing between the first thin wire and the second thin wire is in a range of 20 nm or more and 5000 nm or less.

18. The system for preventing dew condensation on a surface of an object according to claim 11, wherein the spacing between the first thin wire and the second thin wire is in a range of 20 nm or more and 2000 nm or less.

19. The system for preventing dew condensation on a surface of an object according to claim 11, wherein the removing means is a heating means.

20. The system for preventing dew condensation on a surface of an object according to claim 11, wherein the removing means is a dry gas supplying means.

\* \* \* \* \*